United States Patent [19]
Bisker

[11] Patent Number: 5,863,632
[45] Date of Patent: Jan. 26, 1999

[54] DECORATIVE PHOTOGRAPHIC TILE AND METHOD USING SAME

[76] Inventor: Darcy Bisker, 5235 Skytrail, Littleton, Colo. 80123

[21] Appl. No.: 372,509

[22] Filed: Jan. 13, 1995

[51] Int. Cl.$^6$ ..................................................... B32B 9/00
[52] U.S. Cl. .............................. 428/44; 428/13; 428/41.7; 428/42.1; 428/46; 428/47; 428/48; 428/79; 428/201; 428/203; 428/204; 428/205; 428/207; 428/542.2; 428/904.4; 427/207.1; 427/208.4; 156/60; 156/163; 156/241
[58] Field of Search ........................... 428/44, 79, 904.4, 428/913.3, 13, 14, 201, 203, 204, 205, 207, 908.8, 42.1, 41.7, 46, 48, 47, 542.2; 156/60, 163, 241, 244.16, 244.19, 247; 427/207.1, 208.4, 208.8

[56] References Cited

U.S. PATENT DOCUMENTS

| 4,020,204 | 4/1977 | Taylor et al. | 428/40 |
|---|---|---|---|
| 4,054,697 | 10/1977 | Reed et al. | 428/40 |
| 4,079,554 | 3/1978 | Terwilliger | 52/100 |
| 4,125,653 | 11/1978 | Muzik | 428/40 |
| 4,128,688 | 12/1978 | Wiley | 428/311 |
| 4,194,307 | 3/1980 | Payne | 35/49 |
| 4,344,994 | 8/1982 | Batty et al. | 428/41 |
| 4,554,194 | 11/1985 | Hass et al. | 428/40 |
| 4,584,218 | 4/1986 | Travis | 428/40 |
| 4,644,592 | 2/1987 | Small | 4/583 |
| 4,695,493 | 9/1987 | Friedlander et al. | 428/40 |
| 4,791,015 | 12/1988 | Becker et al. | 428/156 |
| 4,804,572 | 2/1989 | Bodrogi | 428/195 |
| 4,828,881 | 5/1989 | Brown et al. | 427/208 |
| 5,162,141 | 11/1992 | Davey et al. | 428/76 |
| 5,196,248 | 3/1993 | Danico et al. | 428/46 |
| 5,304,272 | 4/1994 | Rohrbacker et al. | 156/207 |

OTHER PUBLICATIONS

Stacey Witt Toevs, "More On The Floor", VM+SD, Sep. 1994.

Primary Examiner—William Krynski
Assistant Examiner—Abraham Bahta
Attorney, Agent, or Firm—McDonnell Boehnen Hulbert & Berghoff

[57] ABSTRACT

A decorative photographic floor tile comprising an enlarged photographic print to create a visual decor for use in commercial settings. The photographic floor tile comprises a lamination of clear vinyl on top of a photographic print with a self-adhesive peel-away backing. A method of using the decorative photographic floor tile to create a visual decor.

26 Claims, 2 Drawing Sheets

DECORATIVE PHOTOGRAPHIC TILE AND METHOD USING SAME

FIELD OF THE INVENTION

This invention pertains to decorative photographic tiles and methods of using such tiles to create a visual decor in commercial settings and displays.

BACKGROUND OF THE INVENTION

For years, commercial and retail merchandisers have attempted to visually enhance the surroundings of their product offerings through the use of attractive displays. For example, retail stores often set up displays to promote a particular product line or to promote sales for a particular season or holiday. For a fall clothing line, a store might set up a display of cornstalks, pumpkins, gourds, and bales of hay or a stack of leaves with a rake. To promote a line of swimwear, a display of sand, beach umbrellas and beachballs may be presented. To promote high quality products, expensive marble facings may be used, or Greek or Roman columns constructed.

Attractive displays are effective tools in promoting the sale of products. These displays are frequently changed as new product lines and new seasons or holidays are promoted. Creating and maintaining appealing displays can be a very time-consuming, and expensive proposition. The appropriate props must be purchased and transported to the display site. In addition, removing and storing the displays presents further problems for the merchandiser in that certain items must be properly disposed of and storage space must be allocated for the display props.

Additionally, apart from conventional floor tiling or decorative rugs, the floor space has not been utilized to visually enhance the commercial or retail setting or display. Prior to the present invention there did not exist an effective way to enhance the decor utilizing the floor space.

For a number of years commercial photography labs have created large format photographic prints for use in advertising. For example, large format photographic prints have been placed in wall displays attached to the walls of airport hallways to advertise particular products and companies.

Also, large format ink prints have been used to make large scale posters. However, ink printing is very expensive and is usually only cost-efficient where very high volumes are involved. Furthermore, ink printing does not provide the high quality images which can be achieved through photography. As a result, photographic printing is far superior to ink printing where low volume and high quality products are desired.

OBJECTS OF THE INVENTION

It is an object of the present invention to use photographic tiles comprising photographs of various objects to provide an effective way of enhancing visual decor in commercial settings. It is a further object of the invention to use photographic floor tiles to simulate articles and images to visually enhance commercial settings. It is a further object of the invention to use photographic floor tiles to provide images of products and company logos to enhance commercial settings.

SUMMARY OF THE INVENTION

The invention brings large format photography in the form of photographic tiles to the commercial setting to create a visual decor. The present invention is directed to large scale decorative photographic products and methods of using such products to provide visual decor for use in commercial settings. Use of photography in the form of photographic tiles is used to visually enhance the physical surroundings. The photographic tiles are used to decorate the floors or columns of a particular setting and create a visual or simulated decor.

The photographic floor tiles are intended to enhance the visual decor of commercial settings such as retail stores and displays, trade shows, showrooms, hotel lobbies or other commercial indoor public areas. The photographs used in the photographic tiles can be created using conventional or digital photography and can be photographs of objects such as inanimate, man-made, or naturally-occurring articles, indoor or outdoor scenes, computer-generated images, other photographs, or other camera ready art.

The photographic floor tiles of the present invention may be used to create a simulated decor. For example, photographic floor tiles with life size photographs of naturally occurring objects such as sand, water, leaves, foliage, rock, or marble can be used to a create a simulation of those articles without actually having to use the articles themselves in the setting. A life size photographic floor tile of a sidewalk, rocky path, or a stream or pond, or the like can be used appropriately. Similarly, a beach or water setting could be simulated using the photographic floor tiles. Also, a marble floor could be simulated using photographic tiles made from a photograph of a marble floor. In this manner the photographic tiles create the illusion that the photographed item is actually present.

Similarly, photographic floor tiles can be made from a photograph of a man-made or inanimate object. For example, a photographic floor tile can be made with a full-size photograph of a Persian rug to simulate that rug. In this manner, the photographic floor tile simulates the Persian rug which eliminates the cost of buying the rug, or worrying about the rug being damaged.

The photographic tiles can also be used to decorate the structural columns or posts in the commercial or retail setting. For example, a photographic tile made from a life size photograph of a Roman column could be placed on the structural column to create a simulated Roman column. Similarly, a photographic tile made from a photograph of marble could be placed on the structural column to create a simulated marble column.

Photographic floor tiles may also be used to provide large format images of a product or company logo. For example, a photographic tile using an oversized photograph of a perfume bottle or company logo can be placed on the floor of a commercial or retail setting to visually promote a particular perfume or a particular company's products.

Photographic floor tiles can also be arranged in such a manner to simply form a visually appealing pattern. For example, alternating photographic floor tiles of sand and water can be arranged to create an appealing pattern.

The photographic product consists of a photographic floor tile which can be made as a lamination of a photographic print between a clear vinyl layer on top and a self-adhesive peel-away backing material on the bottom. The photographic tiles can come in a wide variety of sizes from small sizes up to 48"×16' sections, depending upon the application. A visual or simulated decor using the photographic tiles can consist of a single tile or a plurality of tiles used in combination. In a combination of tiles, a number of photographic tiles can be laid together to form a single image or a number of photographic tiles containing different images can be laid together to form a visually appealing pattern.

Because of its lower quality images and higher cost, ink printed images are not a viable alternative for the photographic tiles of the present invention. The photographic tiles of the present invention are typically used where a low volume of tiles is desired and a very high quality print is desired. As a result, tiles using ink printed images would be prohibitively expensive and of an inferior quality.

DETAILED DESCRIPTION OF THE PREFERRED EMBODIMENT OF THE INVENTION

Figure 1:
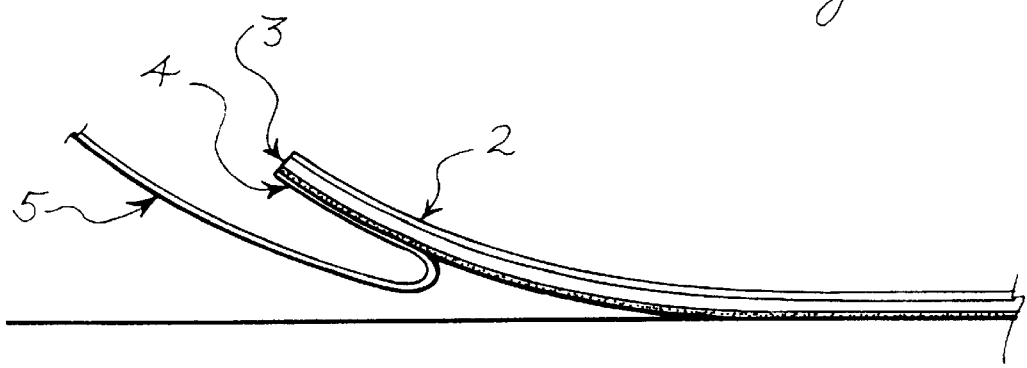
FIG. 1 is a side view of a photographic tile.

As shown in FIG. 1, a digital or conventional photographic image 3 is printed onto Kodak DURAFLEX RA print material using conventional photographic reproduction techniques. The photographic negative is enlarged using a Model 810H enlarger made by Fotar Inc. Using the Fotar Model 810H enlarger and the Kodak DURAFLEX RA print material it is possible to make very large photographic tiles up to 48"×16' in size. DURAFLEX RA is similar to Kodak EKTACOLOR materials except that it is coated on a durable nine millimeter thick white-pigmented thick-based polyester that provides for exceptional durability. The clear vinyl layer 2 is a durable five millimeter thick vinyl. The clear vinyl layer is "Lustex 5" overlaminate from the Permaflex Permacolor product series of Mactac, Inc. of Stow, Ohio. "Lustex 5" is coated with a pressure sensitive adhesive on one side.

The photographic image 3 is over-laminated with the clear vinyl layer 2 using a conventional pressure intensive rolling process.

A self-adhesive backing material 4 is a pressure sensitive mounting film. The backing material 4 is Sealeze Printmount made by Seal Products, Inc. The backing material 4 is laminated to the underside of the photographic image 3 using a conventional pressure intensive rolling process. The backing material 4 has a peel-away release liner 5 which is removed by the customer at the time of installation.

Figure 2:
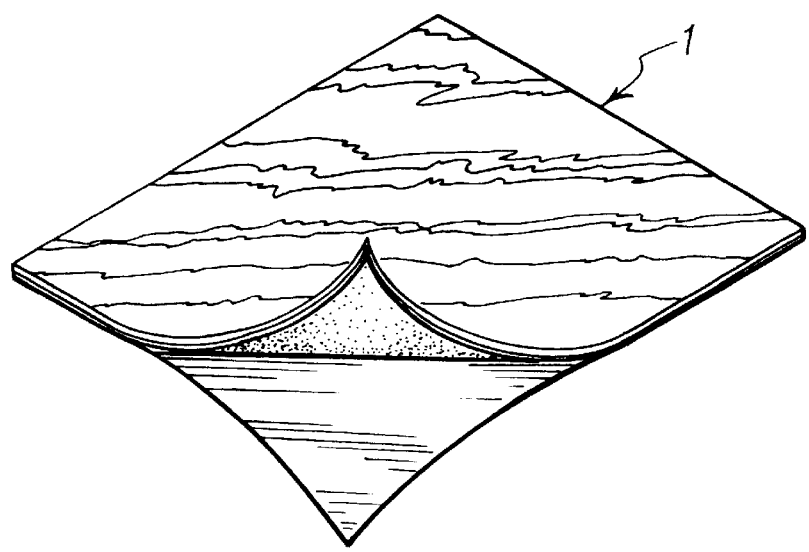
FIG. 2 is a perspective view of a photographic tile.

As shown in FIG. 2, the end result is a photographic tile 1 which is a very durable material that is suitable for flooring and is easily installed and also easily removed. The photographic tiles may be affixed directly to the existing floor of a commercial setting, even if the floor is carpeted or already tiled.

Figure 3:
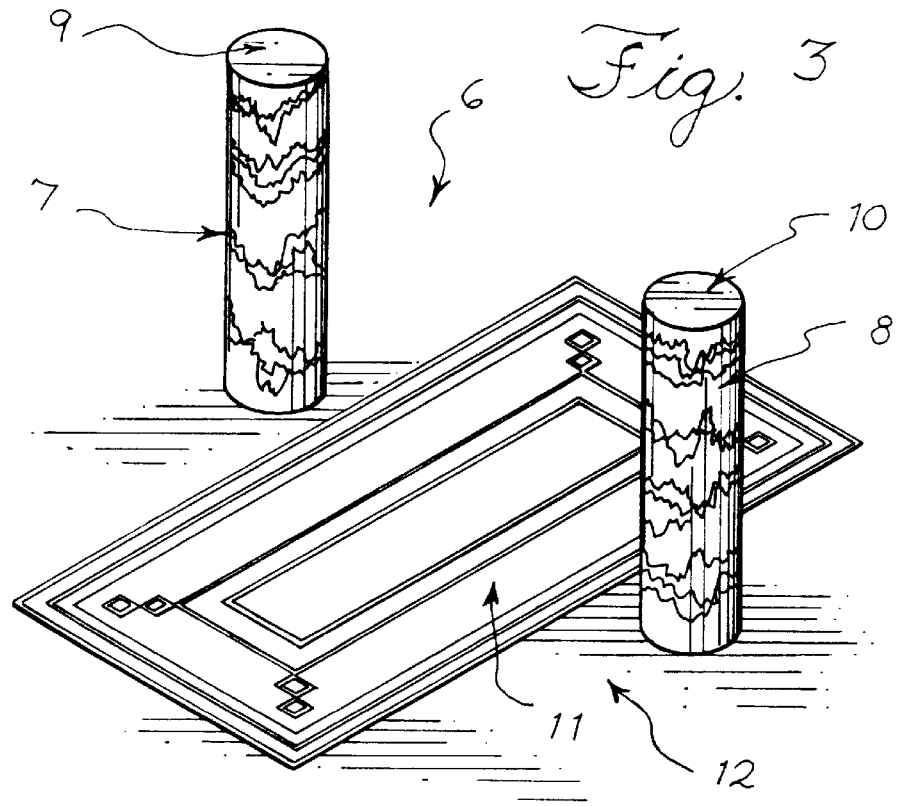
FIG. 3 is a perspective view of a commercial setting wherein photographic tiles have been used to create a visual decor.

As shown in FIG. 3, a commercial setting 6 is depicted wherein simulated marble columns 7 and 8 have been created by affixing photographic tiles comprising photographs of marble to structural columns 9 and 10, said tiles comprising substantially life size photographs of marble. Also shown in FIG. 3 is photographic floor tile 11 which is affixed to the floor 12 to create a simulated 4'×8' Persian Rug. The floor tile 11 comprises a substantially life size photograph of a Persian rug. In this manner, the photographic floor tile 11 creates the illusion that the object of the photograph is actually present.

Figure 4:
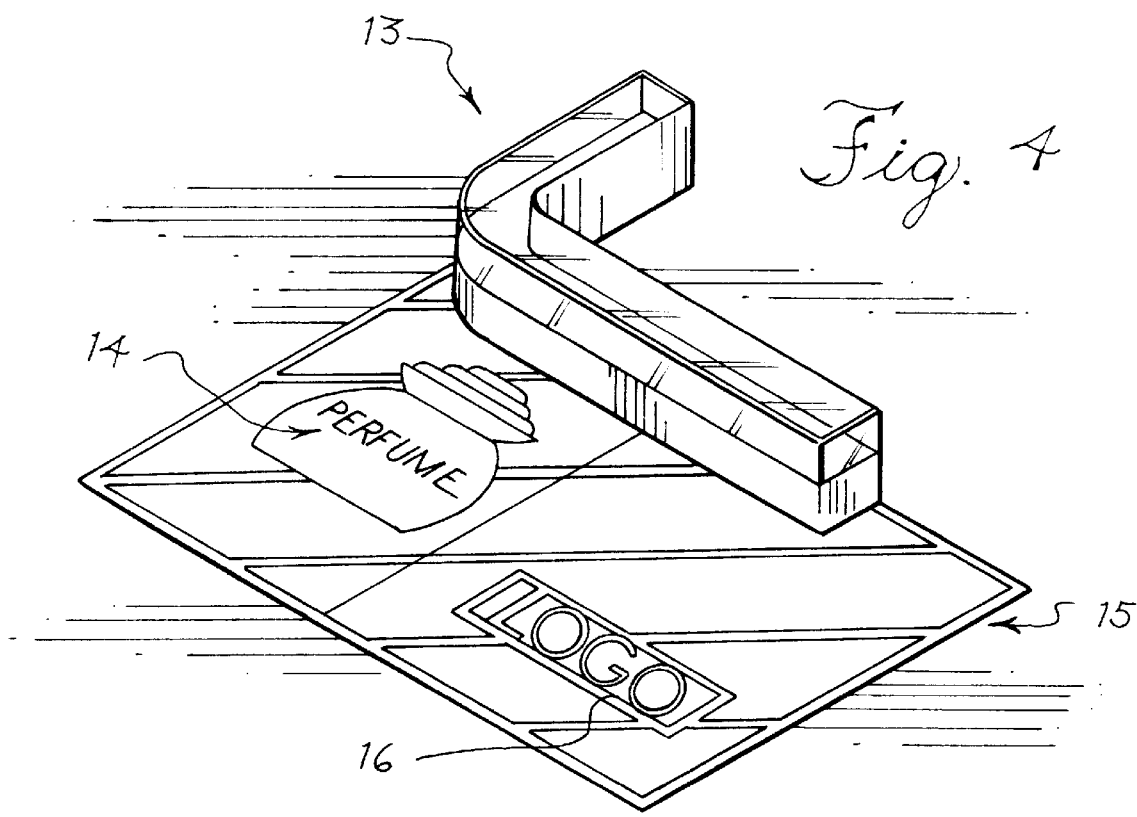
FIG. 4 is a perspective view of a commercial setting wherein photographic tiles have been used to create a visual decor.

As shown in FIG. 4, a commercial setting 13 is depicted wherein a photographic floor tile 14 comprising a photograph of a large perfume bottle is placed on the floor 15 to create a large scale visual image of a perfume bottle. Also shown in FIG. 4 is photographic floor tile 16 containing a photograph of a company logo which is used to create a large scale visual image of the company logo. In this manner, photographic floor tiles using photographs of objects that are larger than life size may be used to create a visually appealing decor.

While the photographic tiles can be constructed from substantially life sized photographs of a particular image or article to create a simulation of that image or article, a less than lifesize photograph of a particular article or image may also be used to create a visually appealing decor. For example, a photograph of an automobile which is not life size may be placed on the floor of an auto showroom to provide a visually appealing promotion of that automobile.

The present invention envisions the use of photographic tiles that contain enlarged photographs of all types of different objects. Examples of such objects may include man-made, inanimate, or naturally-occurring articles, such as sand, water, rocks, foliage, leaves, etc., works of art, other photographs, indoor and outdoor scenes, other visually appealing scenes, company products and logos, computer-generated images, or other camera ready art. In addition, the present invention envisions the use of photographic tiles wherein the object of the photograph has been enlarged to less than life-size, to substantially life-size, or to substantially larger than life-size depending on the particular application or intended effect.

Although the invention has been disclosed with regard to the preferred embodiment, this has been done for illustrative purposes and is not intended to limit the scope of the claims. For instance, photographic floor tiles could be provided on a rigid base or laminated over conventional floor tiles. Furthermore, the photographic floor tiles could be provided without a self-adhesive peel away backing and affixed using conventional adhesives.

I claim:

1. A method of creating a flooring surface comprising the steps of:

providing a floor tile comprising an enlarged photographic print and a transparent protective coating attached to said photographic print, said protective coating defining a barrier to prevent injury to said photographic print from foot traffic and other objects passing over said floor tile;

affixing said floor tile to a floor to create said flooring surface.

2. The method of claim 1, wherein said enlarged photographic print comprises a photograph of an object, and said photographic print has been enlarged sufficiently to create a substantially full scale, full size simulation of said object.

3. The method of claim 1, wherein said enlarged photographic print comprises a photograph of an object, and said photograph has been enlarged sufficiently to create a substantially larger than full scale, full size simulation of said object.

4. A floor tile for use as a flooring surface comprising:

an enlarged photographic print having oppositely disposed first and second major faces; and a transparent protective coating on said first major face, said protective coating defining a barrier to prevent injury to said photographic print from foot traffic and other objects passing over said floor tile.

5. The floor tile of claim 4, wherein said transparent protective coating comprises vinyl.

6. The floor tile of claim 5, wherein said protective coating has a thickness of about 5 millimeters.

7. The floor tile of claim 4 further comprising:
an adhesive disposed on at least a portion of said second major face and adapted to secure said second major face to a floor; and
a backing liner covering said adhesive and removeable therefrom to permit said adhesive to be affixed to said floor.

8. The floor tile of claim 4, wherein said photographic print is a photograph of an object, and said photographic print has been enlarged sufficiently to create a substantially full size, full scale simulation of said object.

9. The floor tile of claim 7, wherein said photographic print is a photograph of an object, and said photographic print has been enlarged sufficiently to create a substantially full size, full scale simulation of said object.

10. The floor tile of claim 4, wherein said photographic print is a photograph of an object, and said photographic print has been enlarged sufficiently to create a substantially larger than full size, full scale simulation of said object.

11. A flooring surface comprising:
an enlarged photographic print having oppositely disposed first and second major faces;
a transparent protective coating on said first major face defining a barrier to prevent injury to said photographic print from foot traffic and other objects passing over said photographic print; and
wherein one or more of said photographic prints is securely affixed to a floor to create said flooring surface.

12. The flooring surface of claim 11, wherein said photographic print is a photograph of an object, and said photographic print has been enlarged sufficiently to create a substantially full size, full scale simulation of said object.

13. The flooring surface of claim 11, wherein said photographic print is a photograph of an object, and said photographic print has been enlarged sufficiently to create a substantially larger than full size, full scale simulation of said object.

14. The flooring surface of claim 11, wherein said flooring surface comprises a plurality of said photographic Prints affixed to said floor in combination to create a visually appealing pattern.

15. The flooring surface of claim 11, wherein said flooring surface comprises a plurality of said photographic prints affixed to said floor in combination to create a simulation of an object.

16. The method of claim 1 wherein said photographic print comprises plastic print material to provide for enhanced durability of the floor tile.

17. The method of claim 1 wherein said photographic print comprises polyester-based print material with a thickness of about 9 millimeters.

18. The floor tile of claim 4 wherein said photographic print comprises plastic print material to provide for enhanced durability of the floor tile.

19. The floor tile of claim 4 wherein said photographic print comprises polyester-based print material with a thickness of about 9 millimeters.

20. The floor tile of claim 4 wherein one or more of said floor tiles are affixed to a floor to define said flooring surface.

21. A floor tile for use as a flooring surface in a commercial merchandising display comprising:
an enlarged graphic print of photographic quality having oppositely disposed first and second major faces; and
a transparent protective coating on said first major face defining a barrier to prevent injury to said photographic print from foot traffic and other objects passing over said floor tile.

22. The floor tile of claim 21 further comprising:
an adhesive disposed on at least a portion of said second major face and adapted to secure said second major face to a floor;
and a backing liner covering said adhesive and removeable therefrom to permit said adhesive to be affixed to said floor.

23. The floor tile of claim 21, wherein said print depicts a retail product, and said print has been enlarged sufficiently to create a substantially full size, full scale simulation of said retail product.

24. The floor tile of claim 21, wherein said print has been enlarged sufficiently to create a large scale reproduction of a company logo as part of said merchandising display.

25. The floor tile of claim 21 wherein one or more of said floor tiles are affixed to a floor in combination to create a photographic simulation of an object.

26. The floor tile of claim 21 wherein said print has been enlarged sufficiently to create a substantially full size, full scale photographic simulation of an actual floor covering or ground terrain.

* * * * *

(12) EX PARTE REEXAMINATION CERTIFICATE (8467th)
United States Patent
Bisker

(10) Number: US 5,863,632 C1
(45) Certificate Issued: Aug. 16, 2011

(54) DECORATIVE PHOTOGRAPHIC TILE AND METHOD USING SAME

(75) Inventor: Darcy Bisker, Littleton, CO (US)

(73) Assignee: Cies Bisker, LLC, Golden, CO (US)

Reexamination Request:
No. 90/010,224, Jul. 22, 2008

Reexamination Certificate for:
Patent No.: 5,863,632
Issued: Jan. 26, 1999
Appl. No.: 08/372,509
Filed: Jan. 13, 1995

(51) Int. Cl.
*B32B 9/00* (2006.01)

(52) U.S. Cl. .......... 428/44; 428/13; 428/41.7; 428/42.1; 428/46; 428/47; 428/48; 428/79; 428/201; 428/203; 428/204; 428/205; 428/207; 428/542.2; 428/904.4; 427/207.1; 427/208.4; 156/60; 156/163; 156/241

(58) Field of Classification Search .......... None
See application file for complete search history.

(56) References Cited

U.S. PATENT DOCUMENTS

| | | |
|---|---|---|
| 2,023,573 A | 12/1935 | Bury |
| 2,180,002 A | 11/1939 | Ford |
| 2,455,777 A | 12/1948 | Jones |
| 2,836,528 A | 5/1958 | Ford |
| 2,987,103 A | 6/1961 | Yakubik |
| 3,068,118 A | 12/1962 | Biskup et al. |
| 3,787,259 A | 1/1974 | Kleinfeld et al. |
| 3,920,870 A | 11/1975 | Ackerman et al. |
| 3,924,023 A | 12/1975 | Boranian et al. |
| 4,077,830 A | 3/1978 | Fulwiler |
| 4,151,319 A | 4/1979 | Sackoff |
| 4,187,131 A | 2/1980 | Shortway et al. |
| 4,197,151 A | 4/1980 | Muzik |
| 4,248,922 A | 2/1981 | Shortway et al. |
| 4,331,508 A * | 5/1982 | Miyama et al. ........ 162/135 |
| 4,644,592 A | 2/1987 | Small |
| 4,689,259 A | 8/1987 | Miller, Jr. et al. |
| 4,746,560 A | 5/1988 | Goeden |
| 4,907,361 A | 3/1990 | Villard |
| 4,944,514 A | 7/1990 | Suiter |
| 5,122,212 A | 6/1992 | Ferguson et al. |
| 5,162,141 A | 11/1992 | Davey et al. |
| 5,167,087 A | 12/1992 | Plumly |
| 5,176,239 A | 1/1993 | Findlay et al. |
| 5,209,340 A | 5/1993 | Munkner et al. |
| 5,271,200 A | 12/1993 | Witt |
| 5,280,831 A | 1/1994 | Conklin, Jr. |
| 5,303,493 A | 4/1994 | Plumly |
| 5,320,693 A | 6/1994 | Helf |
| 5,353,535 A | 10/1994 | Plumly |
| 5,363,579 A | 11/1994 | Plumly |
| 5,484,638 A | 1/1996 | Crabtree |
| 5,524,373 A | 6/1996 | Plumly |

FOREIGN PATENT DOCUMENTS

| | | |
|---|---|---|
| BE | 901.926 | 7/1985 |
| DE | 1 809 794 | 7/1969 |
| GB | 4093 | 2/1897 |
| GB | 2 271 529 A | 4/1994 |
| JP | 60-46246 | 3/1985 |
| JP | 60-47149 | 3/1985 |
| JP | 4-305500 A | 10/1992 |
| WO | WO 92/22051 | 12/1992 |
| WO | 94/08328 | 4/1994 |

OTHER PUBLICATIONS

Curtis & Wright, Eds..; "Glazed Expressions," Tiles and Architectural Ceramis Society, No. 17, Autumn 1988, 16 pages.

(Continued)

*Primary Examiner* — Elizabeth McKane

(57) ABSTRACT

A decorative photographic floor tile comprising an enlarged photographic print to create a visual decor for use in commercial settings. The photographic floor tile comprises a lamination of clear vinyl on top of a photographic print with a self-adhesive peel-away backing. A method of using the decorative photographic floor tile to create a visual decor.

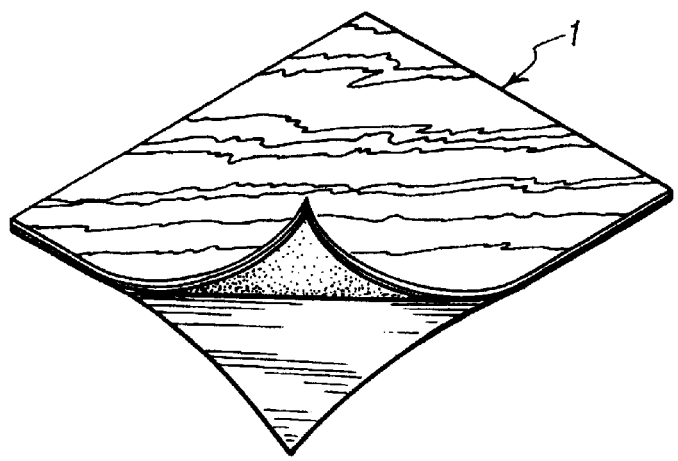

OTHER PUBLICATIONS

"Latimer Road," Decals, R–a–D Magazine, Sep. 1988, 1 page.
Koeppel, D., "McDonald's 'Low Down Value' Menu," Adweek's Marketing Week, Jan. 1, 1991, p. 10.
"Presidential Perspectives: The Wet Seal, Inc.," Visual Merchandising and Store Design, Apr. 1992, pp. 56–59.
Custom Flooring Insets Ad, Visual Merchandising and Store Design, Sep. 1992, p. 66.
Krajewski, S., "Indoor Media Trots Out In–Floor Advertising—New Medium Allows Advertisers to Use Store Floors to Tout Wares," Adweek, May 17, 1993, p. 2.
Gubbins, T., "Shoppers Look Down on New Grocery Ads," The Dallas Morning News, Jun. 16, 1993, 2 pages.
"Floor Sheets' Grab Attention for Latest Guide Dog Ad Push," Campaign Article, Jul. 23, 1993, 1 page.
McMorris, R., "Omahan in Sticky Business," Omaha World–Herald, Jul. 24, 1993, pp. 17, 24.
"Scotchprint™ System Helps Map Earn Entry in Guinness Book," 3M Stemwinder, Aug. 25, 1993, 1 page.
Fehshalt, C., "The Store War Hits the Floor," Supermarket Business, Aug. 1993, p. 66.
American Harlequin Corp. Ad, Visual Merchandising and Store Design, Sep. 1993, p. 84.
"Floor Graphics Application Procedures," 3M Image Graphics, Feb. 1994, 1 page.
Turcsik, R., "Floor–Tile Ads Found to Help Raise Volume," Supermarket News, Jul. 18, 1994, 2 pages.
"Flooring: Excitement Underfoot," Creative Exhibiting Techniques, Jul. 1994, pp. 1–8.
3M Instruction Bulletin 5.19 and Supporting Product Bulletins, published Aug. 1994 by 3M Company, 10 pages.
Toevs, S. W., "Photos on the Floor," Visual Merchandising and Store Design, Sep. 1994, 1 page.
"3M Floor Graphics Provide a Replaceable Visual," P–O–P & Sign Design, Oct. 1994, 2 pages.
"Univ. of Minnesota and Target Sure to Stick with New Signage," Team Marketing Report, 1994, p. 10.
"Advertising Title of the Photo– Decorated Tile Company," http://www.derbycity.com/michael/ad–tile.html, 1 page.
Jones, R., "Firm Goes to the Mat over Store–Floor Ads," http://www.msnbc.msn.com/id/4138966/, 4 pages.
"DDI Signs® Digitally Printed Vinyl Sports Floor Graphics and Sports Logo Decals," DDI Signs, http://www.ddisigns.com/sportsfloorgraphics.htm, 2 pages.
"Make the Most of Your Floor Space . . . 3M Floor Graphics," 3M In–Store Media, 1994, 1 page.
These Ads Can Really Floor You by Kevin G. Demarrais, *The Record*, Jan. 22, 1993, more than one year before the filikng data of the '632 patent.
The World of Ads Has Hit a New Low by Tom Rademacher, *The Grand Rapids Press*, May 13, 1993, more than one year before the filing data of the '632 patent.

\* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 4 and 8 are cancelled.

* * * * *